…

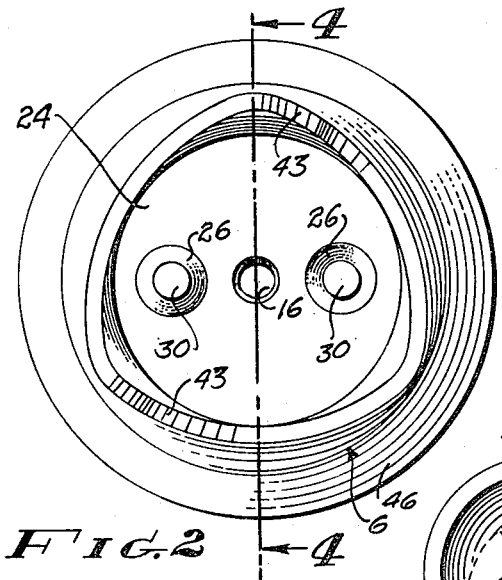
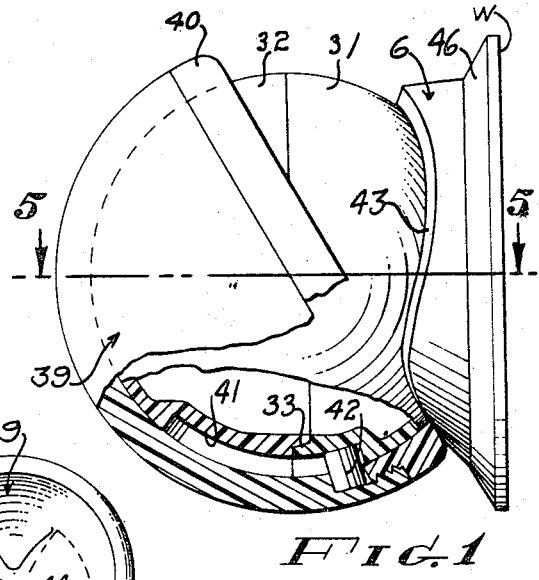
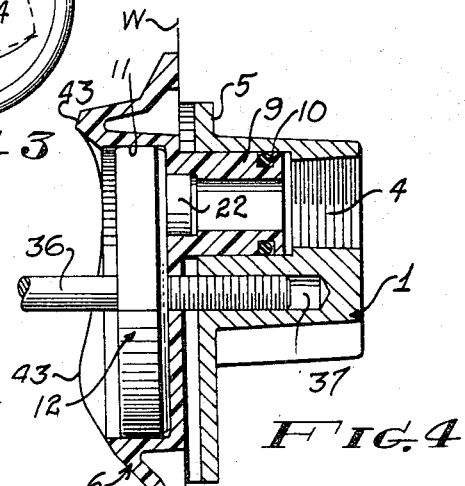
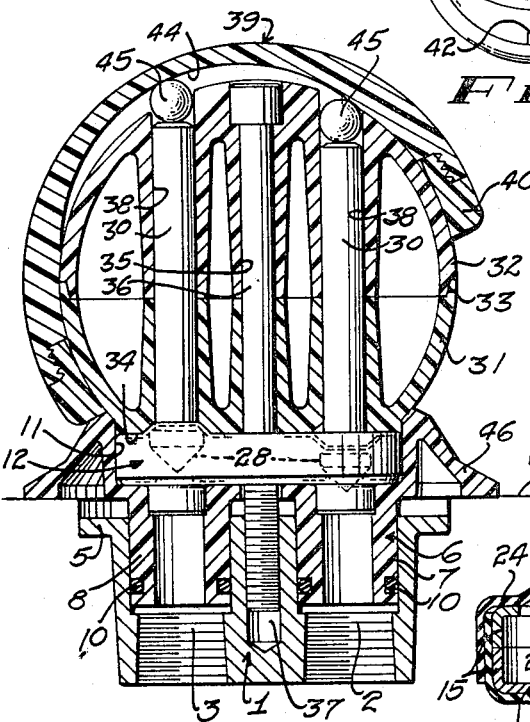
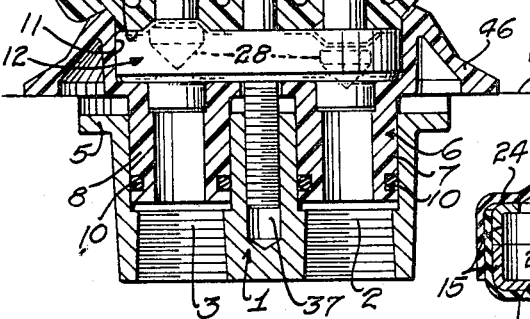
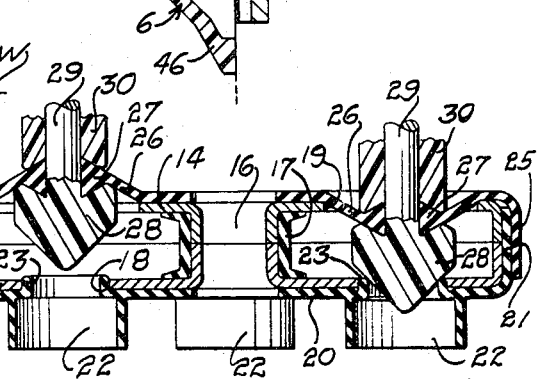

United States Patent Office 3,395,733
Patented Aug. 6, 1968

3,395,733
SPHERICAL PLURAL VALVE ACTUATOR MIXING VALVE
Lloyd Spencer, 220 Patrician Way,
Pasadena, Calif. 91105
Filed Oct. 11, 1965, Ser. No. 494,382
7 Claims. (Cl. 137—636.2)

ABSTRACT OF THE DISCLOSURE

A mixing valve in which an exposed cap is journalled on a spherical journal and is provided with cam areas confronting the journal which are engaged by cam followers extending from a pair of valves through the journal. The movement of the cap is limited by exposed annular confronting stop shoulders, one of which is cam contoured.

---

This invention relates to mixing valves, and, more particularly, to mixing valves of spherical external appearance.

Included in the objects of this invention are:

First, to provide a mixing valve which is related to the mixing valves disclosed in my copending application, Ser. No. 359,392, filed Apr. 13, 1964, now abandoned, with particular reference to the use of a spherically contoured control member having essentially triangular cam areas formed thereon, and a correlated annular but undulated cam shoulder which determines the maximum movement of the control member.

Second, to provide a mixing valve which utilizes the type of replaceable valve unit disclosed in my copending application, Ser. No. 491,771, filed Sept. 30, 1965.

Third, to provide a mixing valve in which the external appearance is bulbous or spherical, and which is so arranged that the outer surface of the control member itself is manually engageable and forms the handle means.

Fourth, to provide a mixing valve which is particularly adapted for use as a shower valve, but not limited to such use, and which is so arranged that essentially the entire valve is disposed outside or above the wall or deck on which it is mounted, so that the entire valve except for a single mounting or manifold member, which is fixed in the wall or deck, is exposed.

With the above and other objects in view as may appear hereinafter, reference is directed to the accompanying drawings, in which:

FIGURE 1 is a side view of that part of the spherical mixing valve which protrudes from the wall, showing portions thereof in section.

FIGURE 2 is a front view of the mixing valve with the handle cap and its spherical journal member removed showing the replaceable valve unit in front elevation.

FIGURE 3 is a reduced view of the back side of the handle cap and cam member showing the cam areas.

FIGURE 4 is a sectional view taken through 4—4 of FIGURE 2, also with the handle cap and its journal member removed, and the replaceable valve unit shown in side elevation.

FIGURE 5 is a sectional view taken through 5—5 of FIGURE 1, including that portion of the valve set within a wall or deck.

FIGURE 6 is an enlarged fragmentary transverse sectional view of the replaceable valve unit.

The spherical mixing valve is supported from a wall W by means of a manifold 1 which is positioned and connected to hot and cold supply lines and an outlet line, not shown, before the wall is completed. The manifold 1 is provided with a cold water inlet bore 2, a hot water inlet bore 3 and an outlet bore 4, defining parallel axes. The inner ends of the bores are screw-threaded for connection to the supply and outlet lines, and the outer ends are counterbored. The outer end of the manifold is provided with a flange 5 which is flush with or recessed into the wall.

The manifold 1 receives a valve housing 6, which is provided with tubular bosses or stems 7, 8 and 9 which fit, respectively, in the cold water inlet bore 2, hot water inlet bore 3, and outlet bore 4, and are provided with seal rings 10. The outer end of the valve housing is provided with a valve unit receiving chamber 11 in the form of a relatively shallow cylindrical recess. The inlet stems 7 and 8 are disposed in a diametrical plane with respect to the recess, whereas the outlet stem 9 is at one side thereof.

The recess or chamber 11 receives a valve unit 12 which includes a pair of complementary circular plates 13 and 14 having abutting marginal rims 15. The plates are provided with aligned central openings 16 formed by abutting tubular bosses. The tubular bosses are surrounded by a seal ring 17.

The plate 13 is provided with three apertures 18 which align with the stems 7, 8 and 9. The plate 14 is provided with two apertures 19, which align with the inlet stems 7 and 8. The plate 13 is covered with a membrane 20 formed of rubber or other elastomer and having a marginal flange 21 covering the abutting rims 15. The membrane 20 is provided with three sealing sleeves 22 which fit within the bores of the stems 7, 8 and 9. The two sleeves 22, which fit within the inlet stems 7 and 8, are provided with internal flanges which form axially yieldable valve seats 23.

The plate 14 is covered with a membrane 24 also formed of rubber or other elastomer and having a marginal flange 25 covering the flange 21 of the membrane 20. The membrane 24 is provided with two axially displaceable diaphragms 26, which cover the apertures 19 and are provided with small central openings each bordered by a rim 27. Interposed between each diaphragm 26 and valve seat 23 is a valve head 28 having a pin 29 extending through the aperture in a diaphragm 26. Each pin is received in a stem 30, so that the diaphragm is clamped and sealed between a valve head 28 and the corresponding stem 30.

A pair of complementary hemispherical journal members 31 and 32 are provided which are joined in a diametrical plane by overlapping flanges 33. The journal member 31 is provided with a flat inner end 34 which covers the chamber 11 to clamp and seal the valve unit 12 therein. The journal members form a central bore 35 which receives a bolt 36, the inner end of which is received in a screw-threaded centrally located socket 37 provided in manifold so that the valve unit is sealingly clamped in place. The journal members also define two valve stem bores 38 which receive the valve stems 30.

Fitted over and rotatable on the journal members 31 and 32, is a hemispherical handle cap 39 which is retained thereon by a retainer ring 40. The handle cap is restrained to two directions of movement by an arcuate slot 41 formed in the journal members 31 and 32 disposed in a plane perpendicular to the common plane of the inlet stems 7 and 8, and a key pin 42 fitted in the handle cap 39.

The valve housing 6 extends spherically from the valve unit receiving chamber 11 to form a three-lobed undulating cam or stop ring 43 which confronts the retainer ring 40. The configuration of the cam ring 43 and the effect of the slot 41 and key pin 42 are such that the handle cap 39 is confined to an essentially triangular movement. Formed on the inner surface of the handle cap 39 confronting the journal members 31 and 32 are a pair of essentially triangular cam areas 44 which overlie valve stem bores 38 and valve stems 30. Cam follower balls 45 are interposed between the valve stems 30 and the cam areas 44, or the outer ends of the valve stems may be hemispherical. The cam areas 44 are so contoured that the cold or hot water valves may be opened or closed individually, in opposition or in unison, as more fully disclosed in the aforementioned copending application, Ser. No. 359,392.

A flange 46 extends from the cam ring 43 to the wall surface W to form an escutcheon covering the manifold 1.

It should be noted that the cam ring or stop 43 may be incorporated in the retainer ring 40, providing that the retainer ring is properly oriented with respect to the handle cap 39.

The mixing valve is so dimensioned that the handle cap 39 is comfortably received in the palm of the user's hand. The mixing valve is, preferably, in its "off" position when the handle cap is in the position shown in FIGURE 1. By moving the handle cap upwardly and to the left, as viewed from a front position, the hot water valve is open. By an upward movement to the right, the cold water valve is opened. Lateral movement opens one valve and closes the other to modulate the temperature of the water.

While the mixing valve is illustrated as a shower valve arranged for mounting on a wall, it should be understood that the valve may be mounted on a horizontal surface for use as a lavatory valve or kitchen valve, as desired.

Having fully described my invention, it is to be understood that I do not wish to be limited to the details herein set forth, but my invention is of the full scope of the appended claims.

I claim:

1. A mixing valve, comprising:
 (a) a spherical journal means having a flattened area and valve stem bores extending through the journal means from said flattened area;
 (b) a cold and a hot water valve means confronting said flattened area and including stems extending through said bores and having cam follower elements at their extremities;
 (c) a handle cap fitted over said journal means and covering said cam follower elements, said handle cap having an external surface directly engageable manually for rotation of said handle cap on said journal means;
 (d) means incorporating said handle cap and journal means for limiting said handle cap to two axes of rotation;
 (e) a first annular stop shoulder surrounding the flattened portion of said journal means; and
 (f) a second stop shoulder formed by the extremity of said handle cap, at least one of said stop shoulders being cam contoured, said stop shoulders being mutually engageable to limit movement of said handle cap, and cooperating with said rotation limiting means to cause said cam followers to generate essentially triangular areas on the inner surface of said handle cap, said areas being contoured to form cams engaged by said cam followers to cause operation of said valve units.

2. A mixing valve, comprising:
 (a) a spherical journal means having a flattened area and valve stem bores extending through the journal means from said flattened area;
 (b) a cold and a hot water valve means confronting said flattened area and including stems extending through said bores and having cam follower elements at their extremities; and
 (c) a semispherical handle cap journalled on said journal means, and including an external and directly manually engageable surface for manipulation of said handle cap, and cam areas formed in the surface of said handle cap confronting said journal means, said cam areas traversing said valve bores on manipulation of said handle cap for engagement by said cam followers to open and close said valve means.

3. The combination with a cold and hot water valve unit having a common outlet and a pair of outwardly directed parallel valve stems terminating in cam followers, of a control means therefor, comprising:
 (a) a spherical journal means extending from said valve units and including parallel bores for receiving said stems;
 (b) an annular stop shoulder surrounding said journal means contiguous to and peripherally of said valve units;
 (c) a handle cap in excess of a half-sphere fitted over and retained on said journal means, the outer surface of said handle cap being directly engageable manually for movement of said handle cap over said journal means, the inner surface of said handle cap having cam areas engageable by said cam followers to control said valve units; and
 (d) means including said stop shoulder for limiting movement of said handle cap to the boundaries defined by said cam areas.

4. The combination with a cold and hot water valve unit having a common outlet and a pair of outwardly directed parallel valve stems terminating in cam followers, of a control means therefor, comprising:
 (a) a spherical journal means extending from said valve units and including parallel bores for receiving said stems;
 (b) a handle cap in excess of a hemisphere fitted over and retained by said journal means, the outer surface of said handle cap being directly engageable manually for rotation over said journal means, and portions of the inner surface of said handle cap forming cam areas engageable by said cam followers to control said valve units; and
 (c) means for limiting movement of said handle cap to the boundaries of said cam areas.

5. A mixing valve, comprising:
 (a) a valve manifold adapted to be mounted within a wall surface and including a cold and a hot water inlet and an outlet defining parallel axes;
 (b) a valve housing including tubular stems sealingly received in said inlets and outlet, and defining a valve unit cavity at its outer side overlying the bores formed by said tubular stems;
 (c) a valve structure received in said recess, said valve structure including valve units for said inlets and valve stems extending outwardly from said valve structure;
 (d) a spherical journal means having an end covering and sealing said valve unit and including guide bores receiving said valve stems;
 (e) a hemispherical handle cap journalled on said journal means and having an outer surface directly engageable for manipulating said handle cap, said handle cap including, in its surface confronting said journal means, cam areas movable across said guide bores;
 (f) cam followers at the outer ends of said stems engageable with said handle cap within said cam areas for controlling said valve units; and
 (g) means confining movement of said handle cap to maintain said cam followers within the boundaries of said cam areas.

6. The combination with a cold and hot water valve unit having a common outlet and a pair of outwardly directed parallel valve stems terminating in cam followers, of a control means therefor, comprising:
 (a) a spherical journal means extending from said valve units and including parallel bores for receiving said stems;
 (b) a hemispherical cap fitting over said journal means and having cam areas formed in portions of its inner surface engageable by said cam followers to control said valve units;

(c) a retainer ring joined to said handle cap and continuing spherically therefrom to retain said cap on said journal means; the extremity of said ring forming an annular stop;

(d) slot and pin means incorporating said journal means and cap to limit said cap to two axes of rotation; and (e) a second annular stop surrounding said journal means;

(f) at least one of said annular stops being so contoured that in combination with said pin and slot means, said stops mutually engage to confine movement of said cap to the boundaries of said cam areas.

7. A mixing valve, comprising:

(a) journal means forming a spherical journal surface in excess of a half sphere;

(b) a base means joined to and supporting said journal means;

(c) a mixing valve unit contained in said base means and journal means, said valve unit including a hot water valve, a cold water valve, inlets and a common outlet therefor, and operating means for said valves terminating in a pair of cam followers penetrating said spherical journal surface;

(d) a cap and handle structure fitting over said journal means and having spherical surfaces encompassing in excess of a half sphere for retention on said journal means;

(e) means incorporating said journal means and said handle and cap structure for limiting said structure to two axes of rotation;

(f) a pair of exposed confronting annular stop shoulders, one shoulder being formed at the base of said journal means, the other stop shoulder being formed at the periphery of said handle and cap structure;

(g) at least one of said stop shoulders being contoured to form a cam cooperating with said rotation limiting means to cause said cam followers to generate essentially triangular areas on said spherical journal surfaces, said areas being contoured to form cams engaged by said cam followers to cause operation of said hot and cold water valves.

References Cited
UNITED STATES PATENTS

| | | | |
|---|---|---|---|
| 2,548,933 | 4/1951 | Barnett | 137—637 |
| 2,653,628 | 9/1953 | Spencer | 137—636 |
| 2,792,847 | 5/1957 | Spencer | 137—636.2 |
| 3,275,036 | 9/1966 | Spencer | 137—636.1 |

CLARENCE R. GORDON, *Primary Examiner.*